United States Patent
Schneider et al.

(10) Patent No.: US 10,868,721 B2
(45) Date of Patent: Dec. 15, 2020

(54) SYSTEM AND METHOD FOR SUPPORTING A SITUATIONAL CONFIGURATION IN AN APPLICATION SERVER ENVIRONMENT

(71) Applicant: ORACLE INTERNATIONAL CORPORATION, Redwood Shores, CA (US)

(72) Inventors: Linda K. Schneider, Santa Clara, CA (US); Christopher Kasso, Los Altos, CA (US); Joseph John Snyder, Wenonah, NJ (US); Lawrence Feigen, Watchung, NJ (US); Timothy Quinn, Forest Hill, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 96 days.

(21) Appl. No.: 15/972,497

(22) Filed: May 7, 2018

(65) Prior Publication Data
US 2019/0058632 A1    Feb. 21, 2019

Related U.S. Application Data

(60) Provisional application No. 62/546,856, filed on Aug. 17, 2017.

(51) Int. Cl.
*G06F 15/177*    (2006.01)
*H04L 12/24*    (2006.01)
(Continued)

(52) U.S. Cl.
CPC ........ *H04L 41/0816* (2013.01); *G06F 16/183* (2019.01); *G06F 16/958* (2019.01); *H04L 43/10* (2013.01)

(58) Field of Classification Search
CPC . G06F 16/183; G06F 16/958; H04L 41/0816; H04L 43/10
See application file for complete search history.

(56) References Cited

U.S. PATENT DOCUMENTS 7,725,572 B1 *   5/2010   Kautzleben ............. H04L 43/00
                                                                  709/224
8,583,769 B1 *  11/2013   Peters ..................... G06F 9/541
                                                                  709/221

(Continued)

OTHER PUBLICATIONS

Pei, Yuanteng (Jeff), "Rest Commander: Scalable Web Server Management and Monitoring", Mar. 11, 2014, 3 pages. Retrieved on Sep. 12, 2017 from http://ebaytechblog.com/2014/03/11/rest-commander-scalable-web-server-management-and-monitoring/.

(Continued)

*Primary Examiner* — Chris Parry
*Assistant Examiner* — Dixon F Dabipi
(74) *Attorney, Agent, or Firm* — Tucker Ellis LLP (57) ABSTRACT

In accordance with an embodiment, described herein is a system and method for supporting a situational configuration in an application server environment includes at least one computer having an application server, enterprise, cloud computing, or other computing environment executing thereon, together with one or more managed server instances that operate as part of a domain and a situational configuration file defining server configuration setting changes and an expiration. The server configuration changes are loaded if the one or more managed server instances detect an addition of the situational configuration file or a change in the situational configuration file. The server configuration changes are unloaded if the one or more managed server instances detect deletion of the situational configuration or expiration of the situational configuration.

15 Claims, 8 Drawing Sheets

(51) Int. Cl.
H04L 12/26 (2006.01)
G06F 16/182 (2019.01)
G06F 16/958 (2019.01)

(56) References Cited

U.S. PATENT DOCUMENTS

| | | | |
|---|---|---|---|
| 8,774,029 B1* | 7/2014 | Mudalegundi | G06F 9/44505 370/252 |
| 2002/0184312 A1 | 12/2002 | Chen | |
| 2004/0215725 A1 | 10/2004 | Love | |
| 2005/0216585 A1 | 9/2005 | Todorova | |
| 2006/0036715 A1 | 2/2006 | Ghattu | |
| 2006/0075001 A1* | 4/2006 | Canning | G06F 8/65 |
| 2007/0044144 A1 | 2/2007 | Knouse | |
| 2011/0320574 A1 | 12/2011 | Felts | |
| 2012/0197972 A1* | 8/2012 | Tukol | G06F 9/44505 709/203 |
| 2014/0006626 A1 | 1/2014 | Breiter | |
| 2014/0012966 A1* | 1/2014 | Baphna | H04L 49/70 709/221 |
| 2014/0136712 A1 | 5/2014 | Kim | |
| 2014/0189681 A1 | 7/2014 | Bryan | |
| 2014/0201242 A1 | 7/2014 | Bakthavachalam | |
| 2014/0365624 A1* | 12/2014 | Whittemore | H04L 41/0806 709/221 |

OTHER PUBLICATIONS

McCool, Michael, "Parallel Pattern 7: Reduce", Dec. 4, 2009, 3 pages. Retrieved on Sep. 12, 2017 from hittp://www.drdobbs.com/architecture-and-design/parallel-pattern-7-reduce/222000718.

Cozzi, Patrick, "Parallel Algorithms", University of Pennsylvania, Spring 2012, 21 pages. Retrieved on Sep. 12, 2017 from http://cis565-spring-2012.github.io/lectures/02-01-Parallel-Algorithms.pdf.

"Oracle® Fusion Middleware Administering WebLogic Server for Oracle Exalogic Elastic Cloud 12c (12.1.3)", Oracle, Jul. 2014, 50 pages.

"Oracle® Fusion Middleware Administering WebLogic Server for Oracle Exalogic Elastic Cloud 12c (12.1.3)"; Chapter 3: "Using the WebLogic Replicated Store for WebLogic Server Messaging Services", downloaded from https://docs.oracle.com/middleware/1213/wls/WLEXA/rs.htm on Dec. 3, 2014, 19 pages.

"Oracle® Fusion Middleware Administering Server Environments for Oracle WebLogic Server 12.1.3", Oracle, Aug. 2015, 98 pages.

"Oracle® Fusion Middleware Administering Server Environments for Oracle WebLogic Server 12.1.3"; Chapter 6: "Using the WebLogic Persistent Store", downloaded from https://docs.oracle.com/middleware/1213/wls/CNFGD/store.htm on Dec. 3, 2014, 30 pages.

"Oracle WebLogic Server 12.1.3 is Released", Will Lyons, Jun. 26, 2014, downloaded from https://blogs.oracle.com/WebLogicServer/entry/oracle_weblogic_server on Dec. 3, 2014, 2 pages.

"Oracle Cloud Control Help for WebLogic Server 12c (12.1.3): Create Replicated Stores", downloaded from https://docs.oracle.com/middleware/1213/wls/WLACH/taskhelp/stores/ on Dec. 3, 2014, 2 pages.

"Block (data storage)", downloaded from https://en.wikipedia.org/wiki/Block_(data_storage) on Jun. 2, 2016, 1 page.

* cited by examiner

SYSTEM AND METHOD FOR SUPPORTING A SITUATIONAL CONFIGURATION IN AN APPLICATION SERVER ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Patent Application titled "SYSTEM AND METHOD FOR SUPPORTING A SITUATIONAL CONFIGURATION IN AN APPLICATION SERVER ENVIRONMENT", Application No. 62/546,856, filed Aug. 17, 2017; which application is herein incorporated by reference.

FIELD OF INVENTION

Embodiments of the invention are generally related to application server, enterprise, cloud computing, or other computing environments, and are particularly related to a system and method for providing support for situational configurations in such environments.

BACKGROUND

In an application server, enterprise, cloud computing, or other computing environment, performing an administrative task or other temporary activity on a server or cluster of servers often requires modifying the system configuration for affected servers. In large clusters or complicated distributed environments such as a cloud environment, consistently setting and removing configuration properties can be difficult because of networking, software and scale issues.

As an example, a common administrative task is the need to patch a series of application server instances or nodes operating within a domain. The application of a patch may include, for example, applying a one-off fix for a specific problem, or installing a periodic version update, and typically requires an administrator to perform a series of steps on each node of a domain, to rollout the patch while minimizing application downtime. Because patching is a complex process potentially taking hours when a patch is being applied to many nodes, such environments can benefit from features that assist during the patching process to improve patching performance or flexibility.

As a further example, debugging a server can include modifying the system configuration to set a debug flag to "on" so that the system generates logs for analysis. As further example, certain settings of a tuning configuration may be modified when servers are heavily loaded or there are network issues, such as can occur during server patching, so that servers do not fall over or time-out. As a still further example, a developer may want to change the system configuration for some amount of time (e.g. a week) while the developer performs testing.

Existing approaches rely on modifying a configuration file for each server, and then, subsequent to the task or activity being performed, returning the configuration file to the original settings. However, this approach relies on an administrator or other responsible individual making the necessary configuration changes correctly and in a timely fashion. This has occasionally been problematic. Not correcting configuration settings can result, for example, in a debug flag set to "on" causing the generation of voluminous, undesired data. Not correcting configuration settings can also result, for further example, in a cluster of servers in a cloud environment underperforming because some or all of the servers are not operating with optimum (or preferred) tuning characteristics.

SUMMARY

In accordance with an embodiment, described herein is a system and method for supporting a situational configuration in an application server environment including one or more managed server instances that operate as part of a domain. The one or more managed server instances are each configured according to an associated default configuration file. A file system includes a defined location accessible to the one or more managed server instances that receives a situational configuration file comprising an extensible markup language (XML) fragment file defining server configuration setting changes and an expiration. A file change observer residing on each of the one or more managed server instances polls the defined location to detect an addition, a change or a deletion of a situational configuration file.

Upon detecting the addition of a situational configuration file or the change in a situational configuration file, the managed server instance associated with the file change observer loads the situational configuration file to override those server configuration settings as identified by the situational configuration file for a length of the expiration. When the length of the expiration is reached, the managed server instance reloads the configuration settings defined by the default configuration file. Upon detecting the deletion of a situational configuration file, the manager server instance reloads the configuration settings defined by the default configuration file.

DETAILED DESCRIPTION

In accordance with an embodiment, described herein is a system and method for supporting a situational configuration in an application server environment including one or more managed server instances that operate as part of a domain. The one or more managed server instances are each configured according to an associated default configuration file. A file system includes a defined location accessible to the one or more managed server instances that receives a situational configuration file comprising an extensible markup language (XML) fragment file defining server configuration setting changes and an expiration. A file change observer residing on each of the one or more managed server instances polls the defined location to detect an addition, a change or a deletion of a situational configuration file.

Application Server (e.g., Multi-Tenant, MT) Environment

Figure 1:
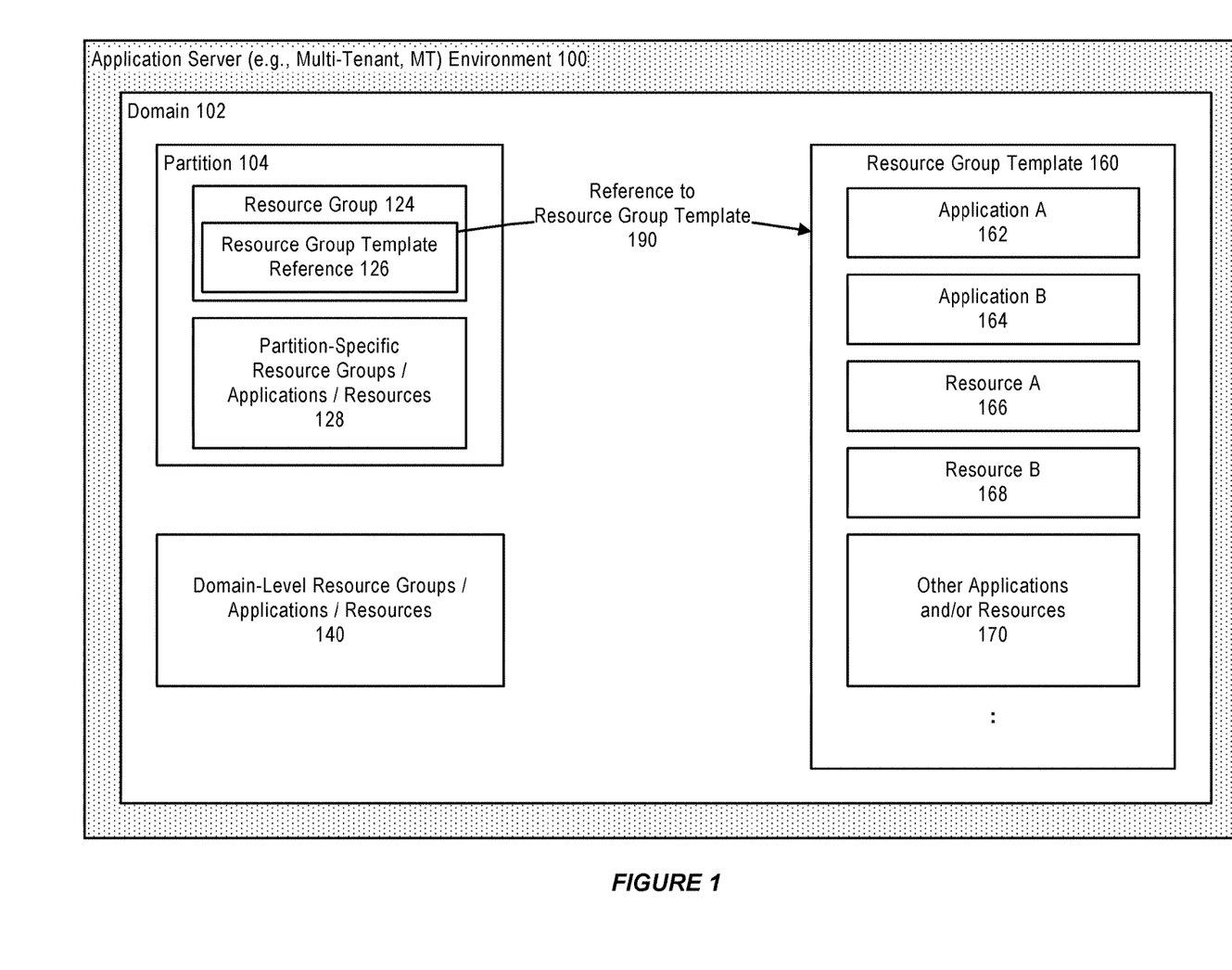
FIG. 1 illustrates a system for supporting multi-tenancy in an application server, cloud, or other computing environment.

FIG. 1 illustrates a system for supporting multi-tenancy in an application server, cloud, or other computing environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
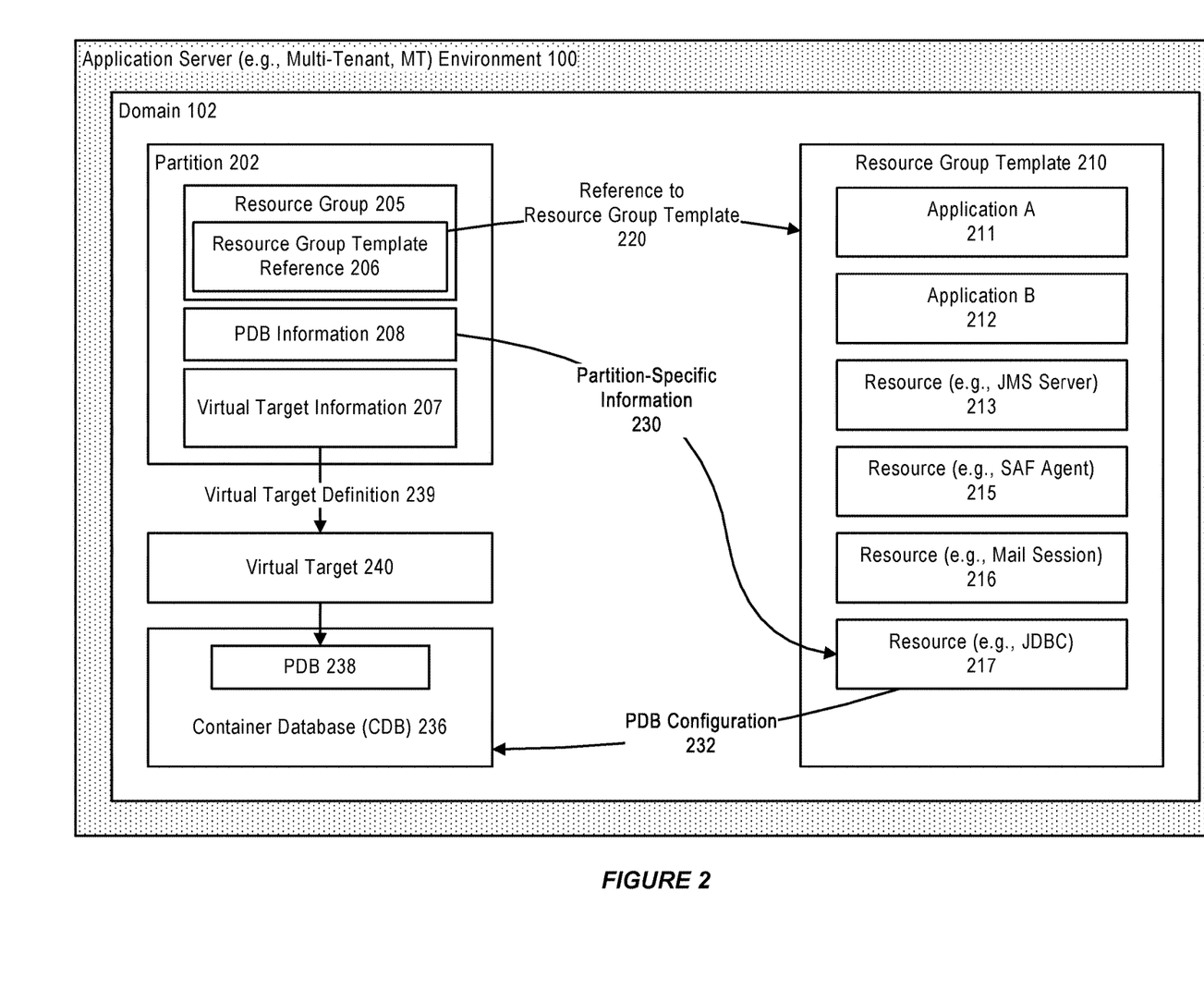
FIG. 2 further illustrates a system for supporting multi-tenancy in an application server, cloud, or other environment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
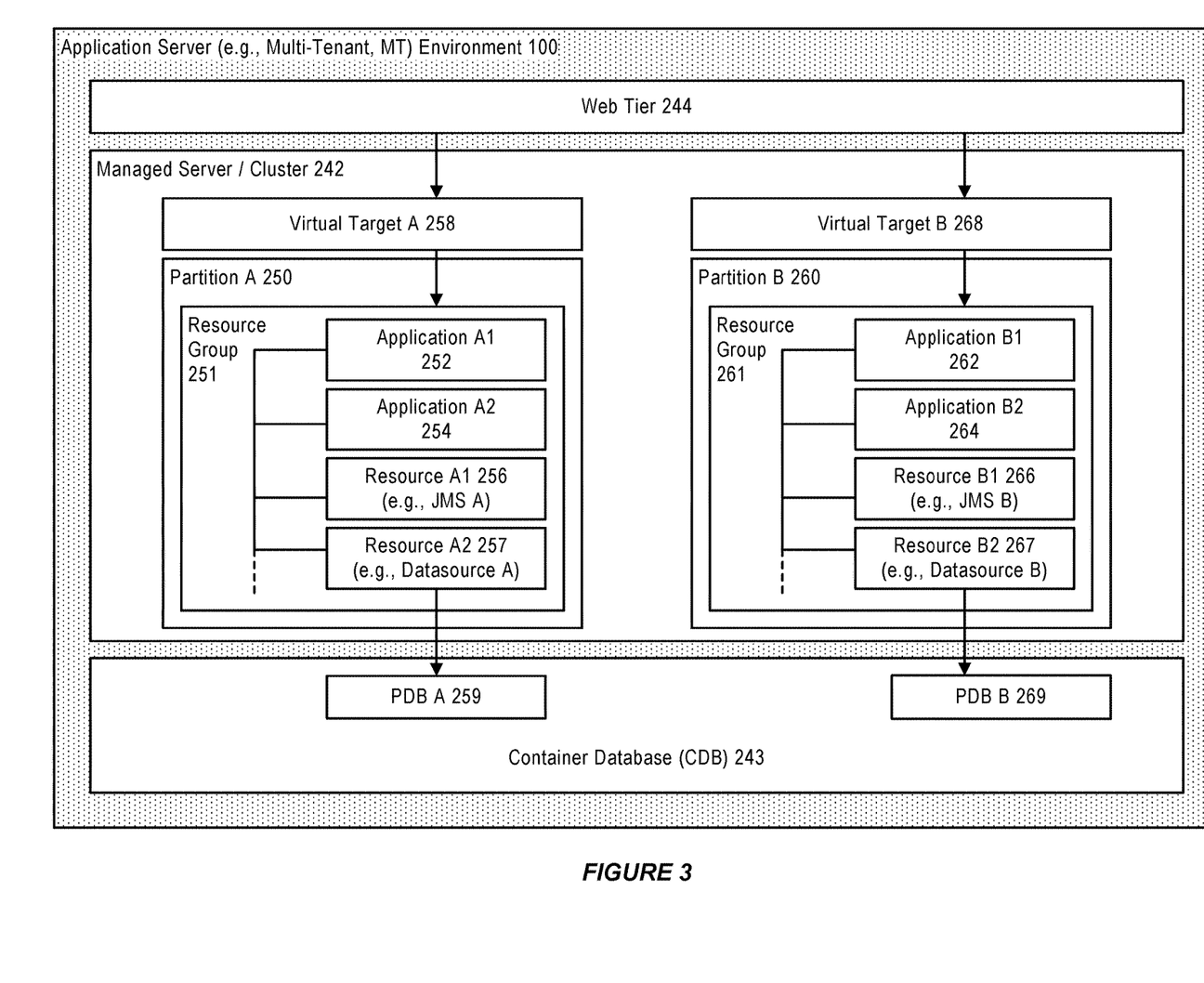
FIG. 3 further illustrates a system for supporting multi-tenancy in an application server, cloud, or other environment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
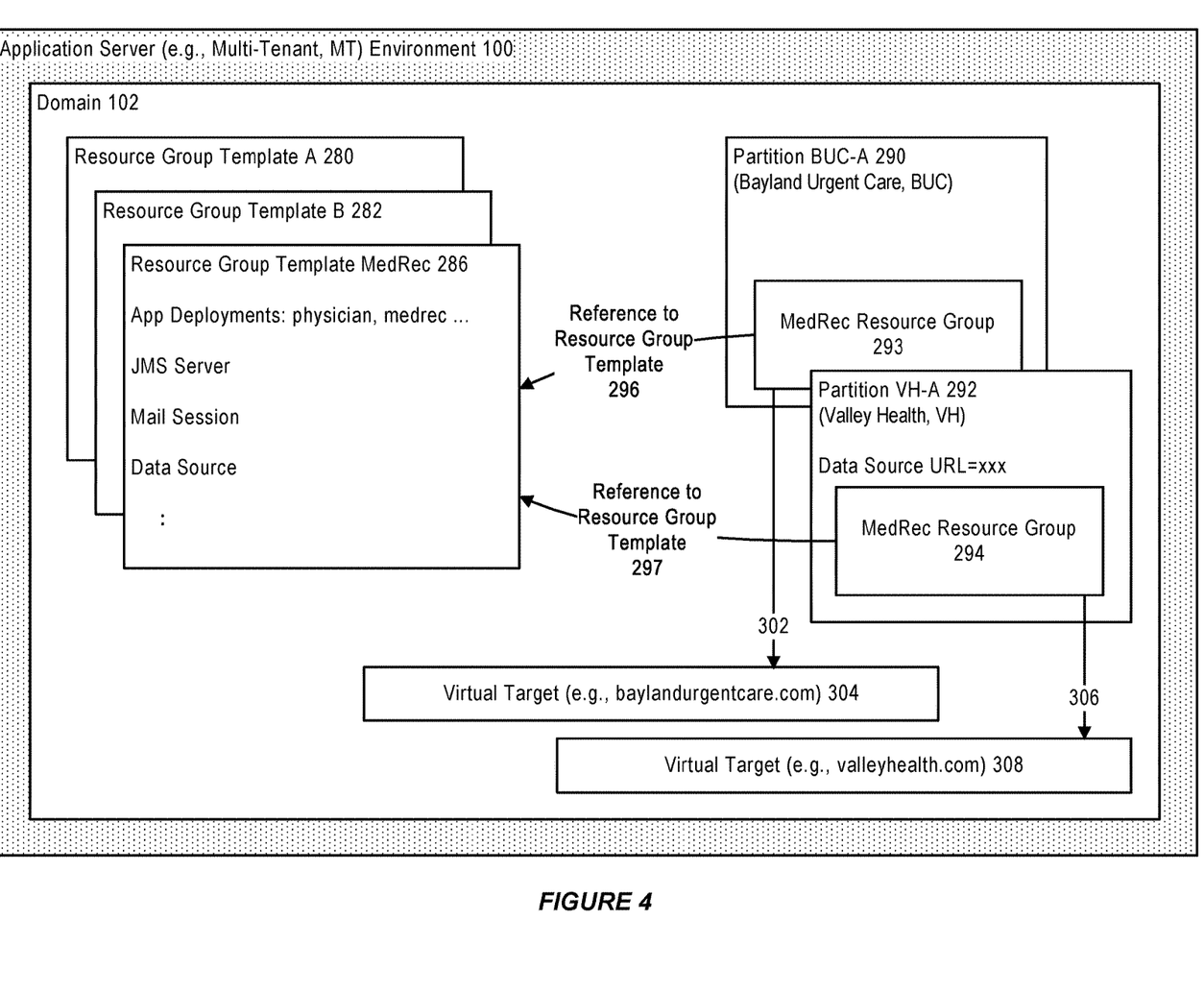
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Federated Configuration

In accordance with an embodiment, the system includes support for a situational configuration, which can be used with an application server environment, so that the runtime configuration of one or more servers in the application server environment is overridden or modified from an initial, base configuration, e.g., located in config.xml and the external descriptors referenced from there, for a predetermined period of time or until the situational configuration is deleted or otherwise removed from a target location.

In an embodiment, at runtime a federated configuration can be loaded from multiple files comprising configuration fragments in the same or multiple locations. A federated configuration can operate as an enabling technology for features such as situational configuration, layered configuration, intra-layer separation of configuration (e.g., storing changes to specific portions of the configuration in different fragments within a single layer), and immutable configuration (which can be considered a special case of intra-layer separation).

For example, in accordance with an embodiment, the system can be configured to: find and invoke configuration transformers, passing the original configuration descriptor and getting back a possibly updated one which is then passed to the next transformer; transform config.xml and external descriptors automatically during server start-up, combining the base configuration with fragments to create the server's initial runtime configuration during start-up; and dynamically reload the runtime configuration on-demand, again combining the base configuration with the then-current transformers (and, therefore, fragments) and applying differences to the running configuration.

In accordance with an embodiment, features built on federated configuration need only to provide their own pluggable configuration transformer, or their own pluggable fragment locator for finding fragments and a way to monitor those fragments (or other sources) for change, so as to trigger dynamic reload when needed.

In accordance with an embodiment, the overall approach to federated configuration is to apply configuration transformers to the XML read from config.xml or external descriptor files before the XML is used to construct a bean tree. There are relatively few places where XML descriptors are read from disk, so taking this approach allows for a minimally-invasive solution. It also helps to avoid the performance cost of creating a bean tree from on-disk XML that will not be used if the fragments are present.

In accordance with an embodiment, federated configuration never changes the contents of config.xml or an external descriptor in permanent storage. Any changes it makes are to the in-memory working runtime configuration tree that governs the behavior of the server.

Adding, Replacing, and Deleting Content Using Fragments

In accordance with an embodiment, a fragment can add new content to the working configuration, replace existing data with alternate content, and delete content. These are three types of fragment actions. If one considers each fragment action as working with subtrees of configuration XML, a fragment action includes navigation to locate the position in the working configuration XML where the root of the affected subtree is (for replace or delete) or will be (for add), and, for add and replace, the XML subtree to be plugged into the working configuration at that point.

In accordance with an embodiment, the fragment provides the complete navigational path from the top-level element to the element which is the top of the subtree to which the action applies. To identify a single instance of a repeating element, the fragment can specify the <name> element and give the value. This is true at every level in the navigation that has repeating elements. If the fragment omits a <name> element in one or more steps along the path then the action(s) will apply to all instances of the type of element for which no <name> was given. After a federated configuration has applied all actions in all fragments, the runtime configuration in the server will reflect the changes induced by the fragments.

Adding Content

In accordance with an embodiment, a fragment can add a subtree to the working configuration by giving the navigation to the highest-level element to be added, decorating that element, e.g. with f:combine-mode='add' XML attribute, and providing the remainder of the subtree to be added. If the working configuration does not already contain a server with name 'newServer' a fragment that creates the server can resemble, as an example, as follows:

```
<domain xmlns="http://xmlns.oracle.com/weblogic/domain"
        xmlns:f="http://xmlns.oracle.com/weblogic/config-fragment">
    <server f:combine-mode='add'>
        <name>newServer</name>
        <listen-address/>
    </server>
</domain>
```

Replacing Content

In accordance with an embodiment, a fragment can replace a subtree already in the working configuration by giving navigation to the highest-level element to be replaced, decorating that element, e.g. with f:combine-mode='replace' XML attribute, and providing the remainder of the subtree that should replace the existing subtree. If the target element of the action does not exist in the working configuration then the replace action has no effect. For example, if the working configuration already contains a partition 'CokePartition,' and resource group 'financeRG,' a fragment that turns off the setting that causes the resource group to use the default targets established by the containing partition can resemble, as an example, as follows:

```
<domain xmlns="http://xmlns.oracle.com/weblogic/domain"
        xmlns:f="http://xmlns.oracle.com/weblogic/config-fragment">
    <partition>
        <name>CokePartition</name>
        <resource-group>
            <name>financeRG</name>
            <use-default-target f:combine-mode='replace'>false</use-default-target>
        </resource-group>
    </partition>
</domain>
```

Deleting Content

In accordance with an embodiment, a fragment deletes a subtree already in the working configuration by giving navigation to the highest-level element to be deleted and decorating that element, e.g. with f:combine-mode='delete' XML attribute. If the target element does not exist in the working configuration then the delete action has no effect. For example, a fragment that removes the 'financeRG' resource group from the 'CokePartition' partition can resemble, as an example, as follows:

```
<domain xmlns="http://xmlns.oracle.com/weblogic/domain"
        xmlns:f="http://xmlns.oracle.com/weblogic/config-fragment">
    <partition>
        <name>CokePartition</name>
        <resource-group f:combine-mode='delete'>
            <name>financeRG</name>
        </resource-group>
    </partition>
</domain>
```

Multiple Actions Per Fragment

In accordance with an embodiment, a single fragment can prescribe more than one action. For example, a fragment that turns off default targeting for one resource group while removing another in the same partition can resemble, as an example, as follows:

```
<domain xmlns="http://xmlns.oracle.com/weblogic/domain"
        xmlns:f="http://xmlns.oracle.com/weblogic/config-fragment">
    <partition>
        <name>CokePartition</name>
        <resource-group>
            <name>financeRG</name>
            <use-default-target f:combine-mode='replace'>false</use-default-target>
        </resource-group>
        <resource-group f:combine-mode='delete'>
            <name>hrRG</name>
```

```
    </resource-group>
  </partition>
</domain>
```

Multiple Fragments Affect the Same Working Configuration in Stages

In accordance with an embodiment, more than one fragment can affect the same working configuration.

Ordering Among Fragments

In accordance with an embodiment, federated configuration handles fragments in the order in which the fragment locators provide them, which is in turn influenced by the order in which fragment locators are handled.

Cumulative Effects of Multiple Fragments

In accordance with an embodiment, when federated configuration applies the first fragment, it reads the base configuration provided to it, applies that fragment, and holds the result internally. That intermediate result, not the original base configuration, is the input to the processing for the second fragment. The output of that processing is stored as the intermediate result, and so on. Once the last fragment has been processed, the intermediate result has evolved to become the final result of that invocation of the federated configuration subsystem for that base configuration. That final result is returned to the caller for use in building the corresponding bean tree. If multiple fragments act on the same area of the base configuration then the fragment processed later wins.

Different Fragments can Affect Different Base Configurations

In accordance with an embodiment, federated configuration can work with config.xml and external descriptors for system resources. Each fragment affects one base configuration type. The navigational path for a fragment action begins with the top-level element. If that element is qualified by its <name> child, then the fragment will apply to just that base configuration. On the other hand, if there is no <name> child with value in the fragment, then the fragment will match all base configurations of that type.

For example, in accordance with an embodiment there might be several data source descriptors in a domain. When each data source descriptor is loaded, the system invokes federated configuration for it. A fragment with a top-level element <jdbc-data-source> but with no <name> child with a value will match the external descriptors for all data sources. A fragment that includes the <name> with a value will select at most one matching base configuration, because a fragment is not required to match any base configuration. Each fragment determines which type of base configuration it will match by specifying the appropriate top-level element.

Situational Configuration

Figure 5:
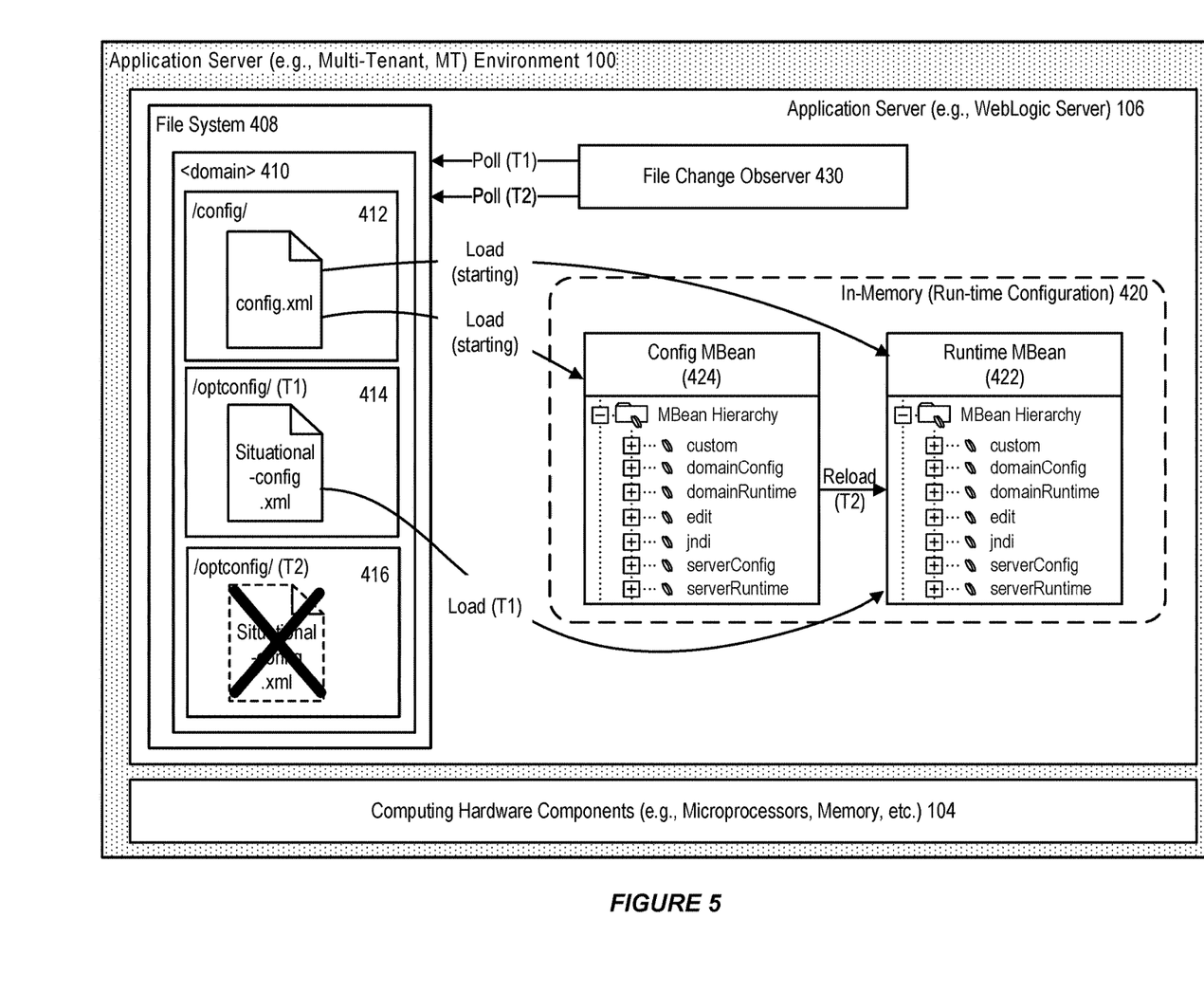
FIG. 5 illustrates a system for supporting situational configuration in an application server, cloud, or other computing environment, in accordance with an embodiment.

FIG. 5 illustrates a situational configuration architecture, for use in an enterprise computing platform, cloud environment, or other computing environment, in accordance with an embodiment.

In accordance with an embodiment, a situational configuration file overrides certain configuration settings defined in a default configuration file. The default configuration file is accessed and used by a server to configure the server upon startup. Once the server is started using the default configuration file, the server periodically polls a file system for the presence (or absence) of a situational configuration file.

Situational configuration files as described herein may be described with reference to systems and methods wherein a single situational file is used to override configuration settings; however, it will be understood that embodiments of systems and methods should not be taken as being limited to having configuration settings overridden or otherwise set via a single situational file. Systems and methods in accordance with embodiments are not constrained to applying one situational configuration file. In some embodiments, more than one situation configuration file can be active at any time.

Still further, one or more situational configuration files may optionally be applied on a server specific basis, so that one or more situational configuration files can override configuration settings on specific servers within an environment. For example, one or more servers in an environment may be designated for use in testing the rollout of a patch, with one or more situational configuration files being applied to the one or more designated servers during testing.

The situational configuration file identifies the configuration settings to be overridden and further includes information identifying its own expiration. Once applied to override certain configuration settings, the server continues to poll for the situational configuration file and if the file is deleted and/or expires, the configuration settings of the servers are rolled back to those in the default configuration file. This allows for an automatic rollback of configuration changes that does not require the default configuration file to be modified and manually returned to its original settings.

In accordance with an embodiment, the default configuration settings, defined for example in a config.xml file, are applied upon startup of a server and are overridden using a situational configuration file comprising an XML fragment with an appropriate extension, e.g. situational-config.xml. The XML fragment contains the values to be changed and the context information for making the changes, and will reference the structure of the tree it is modifying. The situational configuration file defines a temporary configuration and it will appear to the running system as though a configuration change is made, however it will not modify the default configuration file itself. In accordance with an embodiment, wildcards can be supported in fragments of a situation configuration file allowing a single fragment to apply to multiple part of a configuration.

In accordance with an embodiment, the situational configuration file is written using, for example, the syntax described above with respect to federated configuration and is placed in a specific location in a file system local to the server, for example in an /optconfig/directory located in the <domain> directory of a file system local to the server.

In accordance with an embodiment, the file is made temporary by an explicit expiration setting in the situational configuration file. The expiration is set by referencing the schema in the fragment file and setting an expiration time element. Expiration can be defined by either a system time or a W3C-compliant string. In accordance with an embodiment, the expiration can be an absolute date (e.g., in coordinated universal time (UTC)) or a period of elapsed time (e.g., in milliseconds).

The expiration setting referenced by the schema for the fragment file can resemble, as an example, as follows:

```
<?xml version="1.0" encoding="UTF-8" ?>
<xs:schema xmlns:xs="http://www.w3.org/2001/XMLSchema">
    <!-- expiration time for this file -->
    <xs:element name="expiration" type="xs:string"/>
```

```
<!-- The loading policy when errors are encountered. This can be
either "strict" or "lax". -->
<xs:element name="loading-policy" type="xs:string"/>
</xs:schema>
```

The expiration setting identified in the situational-config.xml file to adjust a server message size and turn on a debug flag for jmx core can resemble, as an example, as follows:

```
<?xml version='1.0' encoding='UTF-8'?>
<f:domain
xmlns="http://xmlns.oracle.com/weblogic/domain"
xmlns:f="http://xmlns.oracle.com/weblogic/sit-domain-fragment"
xmlns:s="http://xmlns.oracle.com/weblogic/situational-config" >
    <s:expiration> 2016-07-16T19:20+01:00 </s:expiration>
    <server>
        <name>soa_server1</name>
        <max-message-size f:combine-mode="replace">30000000
        </max-message-size>
    <server-debug>
        <debug-jmx-core f:combine-mode="replace">true</debug-jmx-core>
    </server-debug>
    </server>
</f:domain>
```

The temporary configuration remains in place until either the situational configuration file is deleted or otherwise removed from the designated directory within the file system, e.g. the /optconfig/directory, or the expiration setting in the situational configuration file is exceeded. Once either event occurs, the values defined by the situational configuration file are unloaded and those values are returned to the values defined in the default configuration file.

In accordance with an embodiment, a File Change Observer toolkit residing on a server polls the file system to identify when situational configuration files have been added, changed or deleted. An attribute added to the server-MBean controls how frequently a server polls for situational configuration file changes. The File Change Observer continues to poll the file system until it detects a change or when the situational configuration file is deleted or removed from the specific location by a user, or by expiration of a date identified in the file either by time lapse or specific date and time, and the server is triggered to return to the configuration defined within the default configuration file by the File Change Observer.

Referring again to FIG. 5, a computing environment 102 can include one or more computing hardware components 104 (e.g., a microprocessor, memory, etc), and an application server 106 (e.g., a WebLogic server instance).

As illustrated, upon startup, a server 106 accesses a config.xml file in the /config/directory 412 residing in the <domain> directory 410 of a file system 408 local to the server to obtain all configuration settings for startup and load the runtime MBean 422. After the server has started up and at a first time, T1, the File Change Observer 430 polls a specific location 414 (e.g. /optconfig/directory) and upon detecting a situational-config.xml file, the server accesses the file and the default configuration settings of the server specified in the situational-config.xml file are overridden (Load (T1)) to include values specified in the situational-config.xml file. The configuration settings defined in the situational-config.xml file are loaded into the runtime MBean hierarchy and not the configuration hierarchy 424.

The File Change Observer continues to poll the specific location until such time, T2, when it detects deletion of the situational-config.xml at the specific location 416. The configuration settings defined by config.xml are then reloaded (Reload (T2)) into the runtime MBean.

Figure 6:
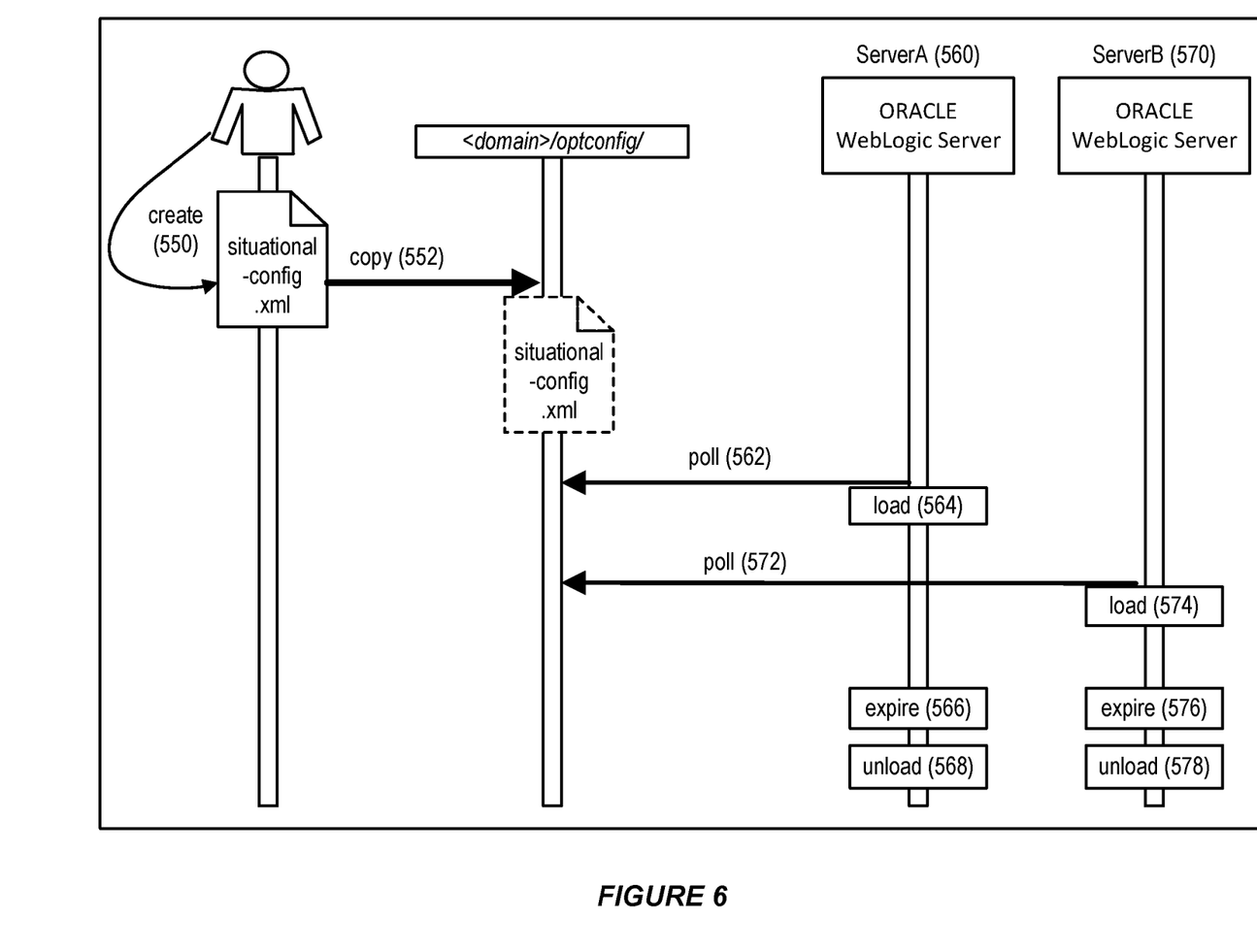
FIG. 6 illustrates a use case of a server environment accessing and loading a situational configuration file, in accordance with an embodiment.

Referring to FIG. 6, multiple servers within an application server environment can access common file systems so that situational configuration files can be loaded on the multiple servers.

As illustrated, a user creates 550 a situational configuration file comprising a fragment file written using federation syntax with the extensional situational-config.xml and including an expiration time indicated by an absolute time and/or date. The situational configuration file is copied 552 to a specific, predetermined location in a file system accessible to two servers, ServerA 560 and ServerB 570. As shown, the specific location is in the /optconfig/folder of <domain>.

As illustrated, ServerA is an Oracle WebLogic Server which is started up based on a default configuration file associated with ServerA some time after the situational-config.xml file is copied to the specific location, with time beginning at the top of the figure and elapsing moving down the figure. Once ServerA starts up, it polls the specific location 562 and loads 564 the situational configuration file, overriding the specified settings of the default configuration of ServerA indicated in situational-config.xml.

ServerB is an Oracle WebLogic Server which is started up based on a default configuration file associated with ServerB sometime after the situational-config.xml file is copied to the specific location. Once ServerB starts up and some time after ServerA loads the situational configuration file, it polls the specific location 572 and thereafter loads 574 the situational configuration file, overriding the specified settings of the default configuration of ServerB indicated in situational-config.xml.

As illustrated, ServerA and ServerB access and load the same situational configuration file, situational-config.xml, which has an expiration setting identifying an expiration time and/or date. ServerA and ServerB therefore have a common expiration time and/or date. At some time after the situational configuration is loaded, the situational configuration expires 566, 576 on both ServerA and ServerB. The configuration settings identified by the situational configuration file are then unloaded 568, 578 on both ServerA and ServerB and the default configurations associated with each of the servers are restored.

Figure 7:
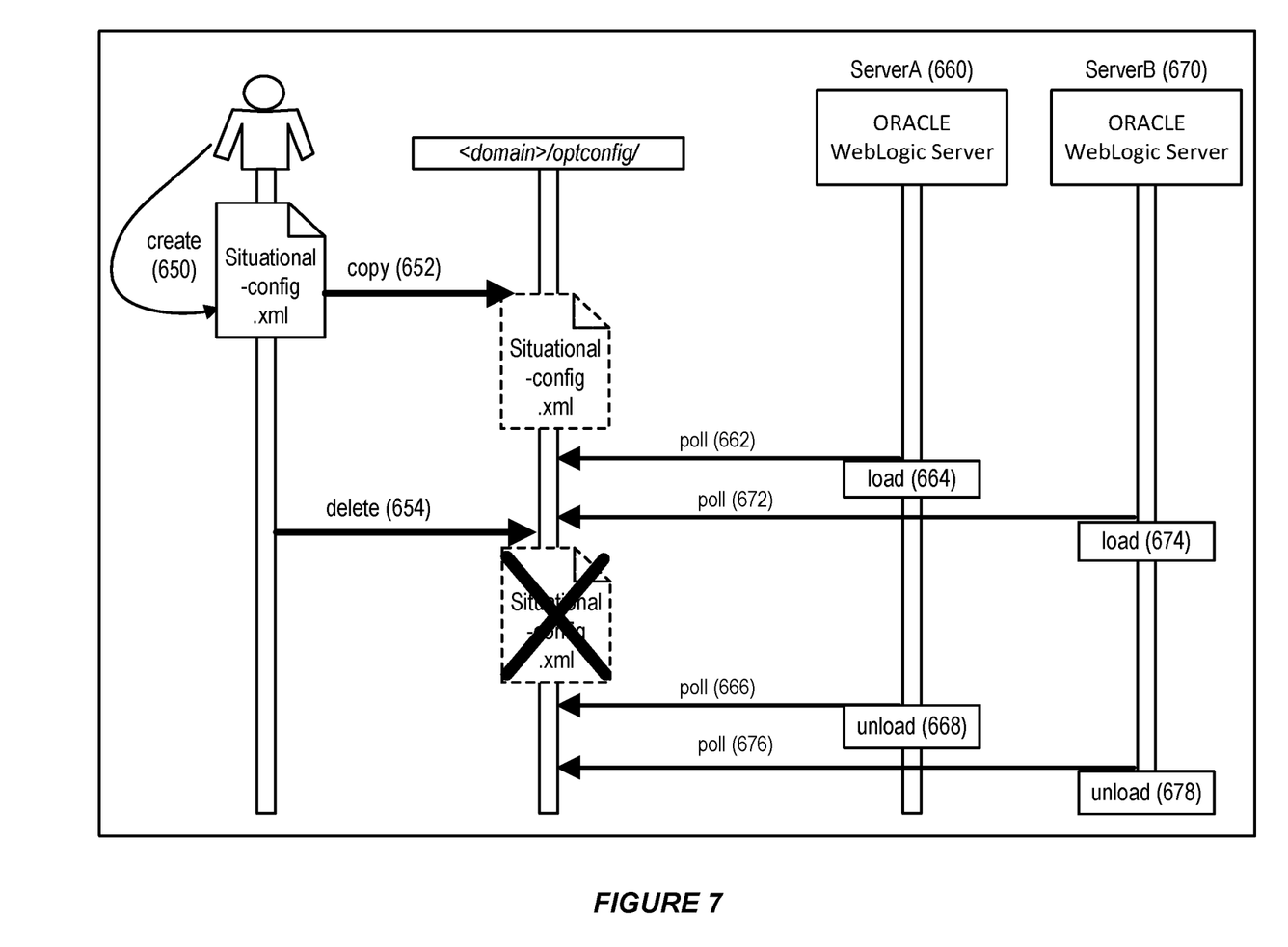
FIG. 7 illustrates a use case of a server environment accessing and loading a situational configuration file, in accordance with an embodiment.

Referring to FIG. 7, multiple servers within an application server environment can access common file systems so that situational configuration files can be loaded on the multiple servers. As illustrated, a user creates 650 a situational configuration file comprising a fragment file written using federated syntax with the extension situational-config.xml and including an expiration time indicated by an absolute time and/or date. The situational configuration file is copied 652 to a specific, predetermined location in a file system accessible to two servers, ServerA 660 and ServerB 670. As illustrated, the specific location is in the /optconfig/folder of <domain>.

As illustrated, ServerA is an Oracle WebLogic Server which is started up based on a default configuration file associated with ServerA some time after the situational-config.xml file is copied to the specific location, with time beginning at the top of the figure and elapsing moving down the figure. Once ServerA starts up, it polls the specific location 662 and loads 664 the situational configuration file, overriding the specified settings of the default configuration of ServerA indicated in situational-config.xml.

ServerB is an Oracle WebLogic Server which is started up based on a default configuration file associated with ServerB sometime after the situational-config.xml file is copied to the specific location. Once ServerB starts up and some time after ServerA loads the situational configuration file, it polls the specific location 672 and thereafter loads 674 the situational configuration file, overriding the specified settings of the default configuration of ServerB indicated in situational-config.xml.

As illustrated, ServerA and ServerB access and load the same situational configuration file: situational-config.xml. At some time after the situational configuration is loaded on ServerA and ServerB, the user deletes 654 the situational-config.xml file from the specific location. At some time after the situational configuration is deleted, ServerA polls 666 the file system and finds that the situational configuration file is deleted or otherwise removed from the /optconfig/directory. ServerA then unloads 668 the configuration settings identified by the situational configuration file and the default configurations associated with ServerA are restored. At some time after the configuration settings of ServerA are restored, ServerB polls 766 the file system and finds that the situational configuration file is deleted or otherwise removed from the /optconfig/directory. ServerB then unloads 768 the configuration settings identified by the situational configuration file and the default configurations associated with ServerB are restored.

Figure 8:
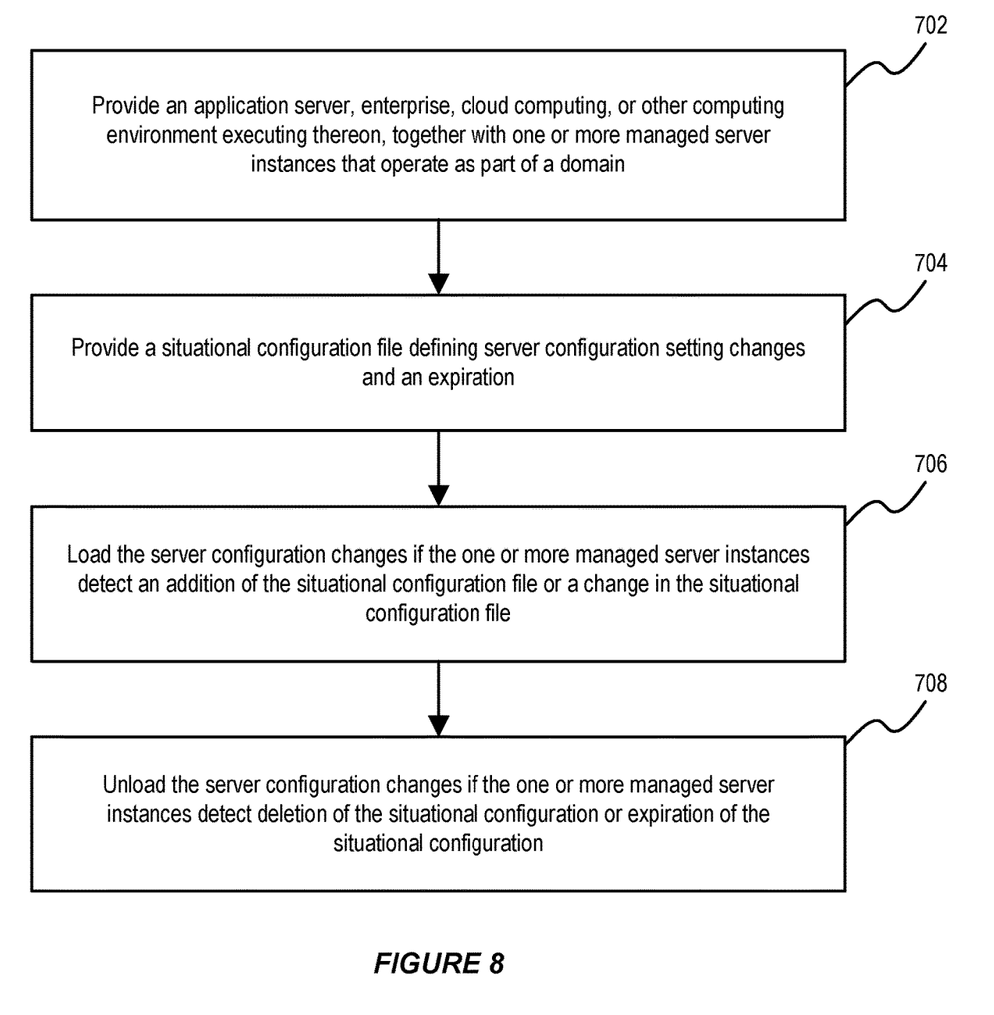
FIG. 8 is a flowchart for a method for supporting situational configuration in an application server, cloud, or other computing environment, in accordance with an embodiment.

FIG. 8 is a flowchart for a method for supporting situational configuration in an application server, cloud, or other computing environment, in accordance with an embodiment. The method comprises providing an application server, enterprise, cloud computing, or other computing environment executing thereon, together with one or more managed server instances that operate as part of a domain (702) and providing a situational configuration file defining server configuration setting changes and an expiration (704). The server configuration changes are loaded if the one or more managed server instances detect an addition of the situational configuration file or a change in the situational configuration file (706). The server configuration changes are unloaded if the one or more managed server instances detect deletion of the situational configuration or expiration of the situational configuration (708).

In accordance with an embodiment, the method further comprises providing a file change observer residing in a runtime Mbean of each of the one or more managed server instances and providing a file system including a defined location accessible to the one or more managed server instances. The defined location can be configured to receive the situational configuration file comprising an extensible markup language (XML) fragment file defining server configuration setting changes and an expiration. The one or more managed server instances are each configured according to an associated default configuration file. The file change observer polls the defined location of the file system to detect one or more of an addition of a situational configuration file, a change in a situational configuration file, and a deletion of a situational configuration.

In accordance with an embodiment, upon detecting the addition of a situational configuration file or the change in a situational configuration file by the file change observer, the managed server instance associated with the file change observer loads the situational configuration file to override those server configuration settings as identified by the situational configuration file for a length of the expiration. When the length of the expiration is reached, the managed server instance associated with the file change observer reloads the configuration settings defined by the default configuration file. Upon detecting the deletion of a situational configuration file by the file change observer, the manager server instance associated with the file change observer reloads the configuration settings defined by the default configuration file.

Embodiment of systems and methods for supporting a situational configuration in an application server environment can eliminate the need for an administrator or other user to manually change config.xml files both to temporarily change the configuration settings and to return them to original settings. This allows configuration settings to be consistently set and removed without difficulty despite networking, software and scaling issues.

While the embodiment described relies on polling a file system local to each server, in other embodiments the situational configuration XML file can be stored in a shared location accessible to multiple physical servers. Still further, the directory names are merely exemplary, and in other embodiments multiple situational-config.xml files can be store in the same or different directories and loaded according to priority.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting a situational configuration in an application server environment, comprising:
a cluster of computers having an application server, enterprise, cloud computing, or other computing environment executing thereon, together with a plurality of managed server instances that operate on said cluster of computers as part of a domain;

wherein each of the plurality of managed server instances are configured according to an associated default configuration file defining default server configuration settings;

a file system including a defined location accessible to the plurality of managed server instances;

a situational configuration file defining situational server configuration settings different than the default server configuration settings and an expiration;

a file change observer operating on each of the plurality of managed server instances wherein the file change observer polls the defined location of the file system to detect one or more of an addition of a situational configuration file to the defined location, a change in the situational configuration file in the defined location, and a deletion of the situational configuration file from the defined location;

wherein upon detecting the addition of a situational configuration file to the defined location by the file change observer, the managed server instance associated with each file change observer loads the situational configuration file to override the default server configuration settings with the situational server configuration settings; and wherein the managed server instance associated with each file change observer reloads the default server configuration settings defined by the default configuration file upon the earliest of reaching the expiration specified in the situational configuration file or detecting, by said each file change observer, the deletion of the situational configuration file from the defined location.

2. The system of claim 1, wherein:

the file change observer resides in a runtime Mbean of each of the plurality of managed server instances; and the defined location is configured to receive the situational configuration file comprising an extensible markup language (XML) fragment file defining server configuration setting changes and an expiration.

3. The system of claim 1, wherein the situational configuration file specifies one or more managed server instances from the plurality of managed server instances to which the situation configuration file is applied.

4. The system of claim 1, wherein the situational configuration file is a first situational configuration file, the system further comprising:

a second situational configuration file defining second server configuration setting changes and an expiration;

wherein the second server configuration setting changes are loaded if the plurality of managed server instances detect an addition of the second situational configuration file or a change in the second situational configuration file; and wherein the second server configuration setting changes are unloaded if the plurality of managed server instances detect deletion of the second situational configuration file or expiration of the second situational configuration file.

5. The system of claim 2, wherein the XML fragment file includes one or more wildcards applying a fragment within the XML fragment file to multiple configuration settings.

6. A method for supporting a situational configuration in an application server environment, comprising a cluster of computers having an application server, enterprise, cloud computing, or other computing environment executing thereon, together with a plurality of managed server instances that operate as part of a domain, the method comprising:

configuring each of the plurality of managed servers according to an associated default configuration file defining default server configuration settings;

providing a file system including a defined location accessible to the plurality of managed server instances;

providing a situational configuration file defining situational server configuration settings different than the default server configuration settings and an expiration, operating a file change observer on each of the plurality of managed server instances wherein the file change observer polls the defined location of the file system to detect one or more of an addition of a situational configuration file to the defined location, a change in the situational configuration file in the defined location, and a deletion of the situational configuration file from the defined location;

upon detecting the addition of a situational configuration file to the defined location by each file change observer, loading the situational configuration file to override the default server configuration settings with the situational server configuration settings on the managed server instance associated with each file change observer; and reloading, on each managed server instance associated with each file change observer, the default server configuration settings defined by the default configuration file upon the earliest of reaching the expiration specified in the situational configuration file or detecting, by said each file change observer, the deletion of the situational configuration file from the defined location.

7. The method of claim 6, further comprising:

providing the file change observer in a runtime Mbean of each of the plurality of managed server instances; and wherein the situational configuration file comprises an extensible markup language (XML) fragment file defining server configuration setting changes and an expiration.

8. The method of claim 6, wherein the situational configuration file specifies one or more managed server instances from the plurality of managed server instances to which the situation configuration file is applied.

9. The method of claim 6, wherein the situational configuration file is a first situational configuration file, the method further comprising:

providing a second situational configuration file defining second server configuration setting changes and an expiration;

wherein the second server configuration setting changes are loaded if the plurality of managed server instances detect an addition of the second situational configuration file or a change in the second situational configuration file; and wherein the second server configuration setting changes are unloaded if the plurality of managed server instances detect deletion of the second situational configuration file or expiration of the second situational configuration file.

10. The method of claim 7, wherein the XML fragment file includes one or more wildcards applying a fragment within the XML fragment file to multiple configuration settings.

11. A non-transitory computer readable storage medium, including instructions stored thereon for supporting a situational configuration in an application server environment, comprising a cluster of computers having an application server, enterprise, cloud computing, or other computing environment executing thereon, together with a plurality of managed server instances that operate as part of a domain, which instructions, when executed cause said cluster of computers to perform steps comprising:

configuring each of the plurality of managed servers according to an associated default configuration file defining default server configuration settings;

providing a file system including a defined location accessible to the plurality of managed server instances;

providing a situational configuration file defining situational server configuration settings different than the default server configuration settings and an expiration,     operating a file change observer on each of the plurality of managed server instances wherein the file change observer polls the defined location of the file system to detect one or more of an addition of a situational configuration file to the defined location, a change in the situational configuration file in the defined location, and a deletion of the situational configuration file from the defined location;

upon detecting the addition of a situational configuration file to the defined location by each file change observer, loading the situational configuration file to override the default server configuration settings with the situational server configuration settings on the managed server instance associated with each file change observer; and     reloading, on each managed server instance associated with each file change observer, the default server configuration settings defined by the default configuration file upon the earliest of reaching the expiration specified in the situational configuration file or detecting, by said each file change observer, the deletion of the situational configuration file from the defined location.

12. The non-transitory computer readable storage medium of claim 11, further including instructions stored thereon which when read and executed by said cluster of computers cause said cluster of computers to perform further steps comprising:

providing the file change observer residing in a runtime Mbean of each of the plurality of managed server instances;

and wherein the situational configuration file comprises an extensible markup language (XML) fragment file defining server configuration setting changes and an expiration.

13. The non-transitory computer readable storage medium of claim 11, wherein the situational configuration file specifies one or more servers instances from the plurality of server instances to which the situation configuration file is applied.

14. The non-transitory computer readable storage medium of claim 11, wherein the situational configuration file is a first situational configuration file, and further including instructions stored thereon which when read and executed by said cluster of computers cause said cluster of computers to perform further steps comprising:

providing a second situational configuration file defining second server configuration setting changes and an expiration;

wherein the second server configuration setting changes are loaded if the plurality of managed server instances detect an addition of the second situational configuration file or a change in the second situational configuration file; and     wherein the second server configuration setting changes are unloaded if the plurality of managed server instances detect deletion of the second situational configuration file or expiration of the second situational configuration file.

15. The non-transitory computer readable storage medium of claim 12, wherein the XML fragment file includes one or more wildcards applying a fragment within the XML fragment file to multiple configuration settings.

\* \* \* \* \*